US012572224B2

(12) United States Patent
Aurongzeb et al.

(10) Patent No.: US 12,572,224 B2
(45) Date of Patent: Mar. 10, 2026

(54) SYSTEM AND METHOD OF ASSEMBLING AN ELECTROMAGNETIC SPRING BACK RAPID CLICK MOUSE

(71) Applicant: Dell Products, LP, Round Rock, TX (US)

(72) Inventors: Deeder M. Aurongzeb, Austin, TX (US); Weijong Sheu, Austin, TX (US); Peng Lip Goh, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/386,439

(22) Filed: Nov. 2, 2023

(65) Prior Publication Data

US 2025/0147601 A1     May 8, 2025

(51) Int. Cl.
| | |
|---|---|
| *G06F 3/0354* | (2013.01) |
| *H01F 7/02* | (2006.01) |
| *H01F 7/06* | (2006.01) |
| *H01F 41/06* | (2016.01) |

(52) U.S. Cl.
CPC ....... *G06F 3/03543* (2013.01); *H01F 7/0242* (2013.01); *H01F 7/064* (2013.01); *H01F 41/06* (2013.01)

(58) Field of Classification Search
CPC .... G06F 3/03543; H01F 7/0242; H01F 7/064; H01F 41/06
See application file for complete search history.

(56) References Cited

U.S. PATENT DOCUMENTS

| | | | |
|---|---|---|---|
| 3,619,524 A | 11/1971 | Gillund | |
| 6,243,078 B1 * | 6/2001 | Rosenberg | ............ A63F 13/285 |
| | | | 345/161 |
| 6,937,225 B1 | 8/2005 | Kehlstadt | |
| 7,747,702 B2 | 6/2010 | Anderson | |
| 9,495,021 B2 | 11/2016 | Irani | |
| 10,705,629 B1 | 7/2020 | Arnold | |
| 10,928,969 B2 | 2/2021 | Hsu | |
| 10,936,091 B1 | 3/2021 | Tseng | |
| 10,946,275 B2 | 3/2021 | Wolff-Petersen | |
| 11,301,054 B1 | 4/2022 | Drezet | |
| 11,422,645 B2 | 8/2022 | Hsu | |
| 11,670,467 B2 | 6/2023 | Goh | |
| 2001/0055002 A1 | 12/2001 | Endo | |

(Continued)

*Primary Examiner* — Brent D Castiaux

(74) *Attorney, Agent, or Firm* — Prol Intellectual Property Law, PLLC; H. Kenneth Prol

(57) ABSTRACT

An electromagnetic spring back rapid click mouse for an information handling system comprising a key plate forming a portion of a top cover for receiving downward force by a user of a key plate click actuation, a permanent magnet operatively coupled to a bottom surface of the key plate and an electromagnetic spring back system electromagnet operatively coupled to a mouse printed circuit board (PCB) where the electromagnet includes a solenoid coil wrapped around a ferromagnetic bar that is magnetized when the solenoid coil receives a current pulse to repel the permanent magnet and urge the permanent magnet and the key plate to rebound to a neutral position after the key plate click actuation. A key plate plunger of key plate switch on the mouse PCB receives the key plate click actuation and a mouse controller detects the key plate click actuation from the key switch via the mouse PCB.

20 Claims, 6 Drawing Sheets

(56)	References Cited

U.S. PATENT DOCUMENTS

| 2005/0104853 | A1 | 5/2005 | Sitalasai | |
| 2005/0110755 | A1 | 5/2005 | Harley | |
| 2005/0170778 | A1 | 8/2005 | Uchiyama | |
| 2006/0250360 | A1 | 11/2006 | Goodwin | |
| 2008/0106523 | A1 | 5/2008 | Conrad | |
| 2008/0297328 | A1 | 12/2008 | Crawford | |
| 2012/0299832 | A1 | 11/2012 | Peterson | |
| 2015/0286295 | A1 | 10/2015 | Pepe | |
| 2015/0302966 | A1* | 10/2015 | Soelberg | A63F 13/22 |
| | | | | 463/37 |
| 2017/0220139 | A1 | 8/2017 | Forde | |
| 2019/0146600 | A1 | 5/2019 | Tsai | |
| 2019/0339793 | A1* | 11/2019 | Rizvi | H01H 13/20 |
| 2020/0012357 | A1 | 1/2020 | Lien | |
| 2020/0167008 | A1 | 5/2020 | Wang | |
| 2021/0132707 | A1 | 5/2021 | Chen | |
| 2022/0344113 | A1* | 10/2022 | Goh | A63F 13/24 |

* cited by examiner

SIDE CUT-AWAY
VIEW

PERSPECTIVE CUT-AWAY
VIEW

CLOSE-UP
SIDE CUT-AWAY
VIEW

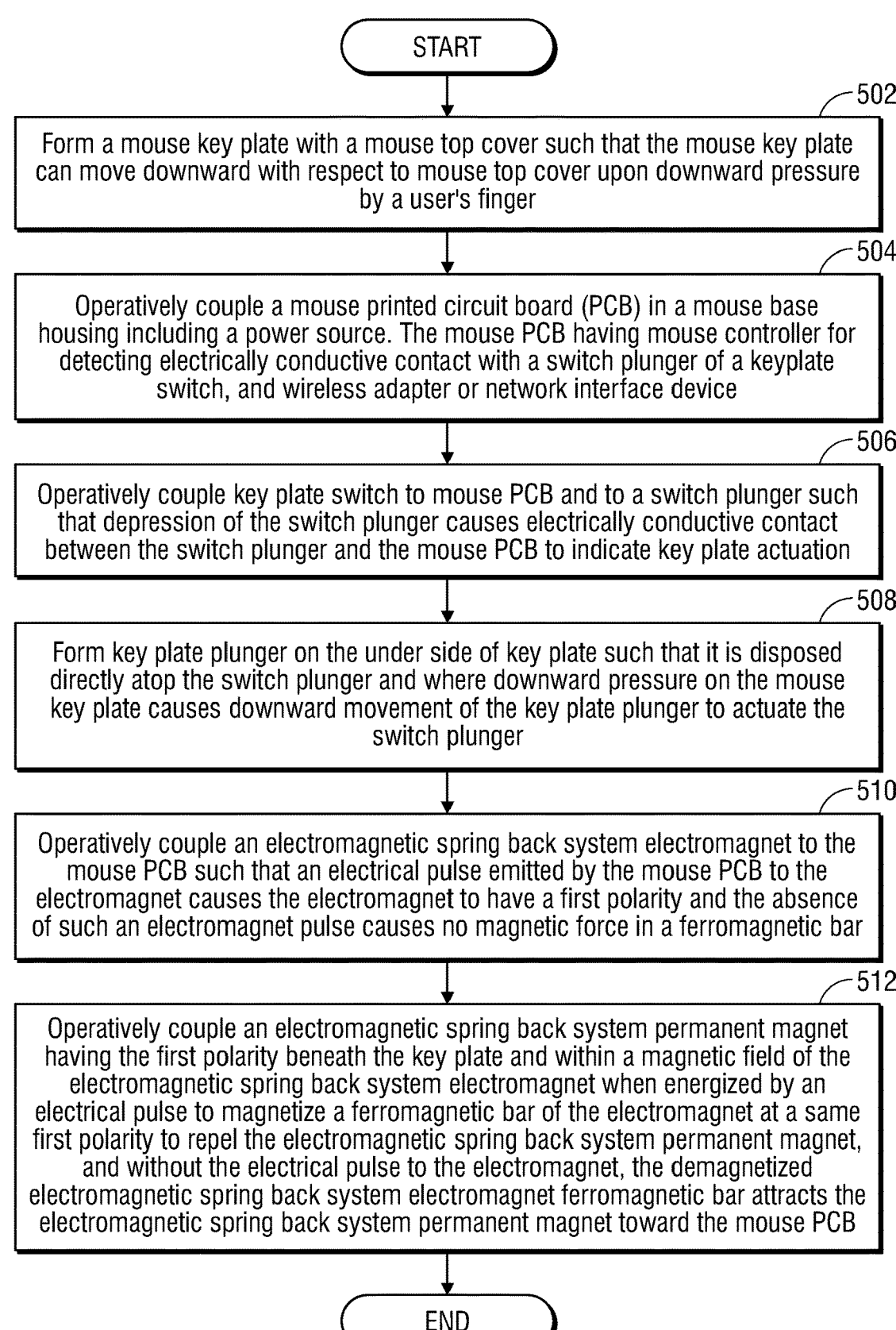

START

502

Form a mouse key plate with a mouse top cover such that the mouse key plate can move downward with respect to mouse top cover upon downward pressure by a user's finger

504

Operatively couple a mouse printed circuit board (PCB) in a mouse base housing including a power source. The mouse PCB having mouse controller for detecting electrically conductive contact with a switch plunger of a keyplate switch, and wireless adapter or network interface device

506

Operatively couple key plate switch to mouse PCB and to a switch plunger such that depression of the switch plunger causes electrically conductive contact between the switch plunger and the mouse PCB to indicate key plate actuation

508

Form key plate plunger on the under side of key plate such that it is disposed directly atop the switch plunger and where downward pressure on the mouse key plate causes downward movement of the key plate plunger to actuate the switch plunger

510

Operatively couple an electromagnetic spring back system electromagnet to the mouse PCB such that an electrical pulse emitted by the mouse PCB to the electromagnet causes the electromagnet to have a first polarity and the absence of such an electromagnet pulse causes no magnetic force in a ferromagnetic bar

512

Operatively couple an electromagnetic spring back system permanent magnet having the first polarity beneath the key plate and within a magnetic field of the electromagnetic spring back system electromagnet when energized by an electrical pulse to magnetize a ferromagnetic bar of the electromagnet at a same first polarity to repel the electromagnetic spring back system permanent magnet, and without the electrical pulse to the electromagnet, the demagnetized electromagnetic spring back system electromagnet ferromagnetic bar attracts the electromagnetic spring back system permanent magnet toward the mouse PCB

END

SYSTEM AND METHOD OF ASSEMBLING AN ELECTROMAGNETIC SPRING BACK RAPID CLICK MOUSE

FIELD OF THE DISCLOSURE

The present disclosure generally relates to assembly of a mouse for an information handling system. More specifically, the present disclosure relates to the assembly of a wired or wireless mouse with an electromagnetic spring back system for increasing the speed at which a mouse key plate can register user key clicks.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices or wireless connectivity to wireless peripheral input/output devices that may also include a wired or wireless mouse, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

Figure 6:
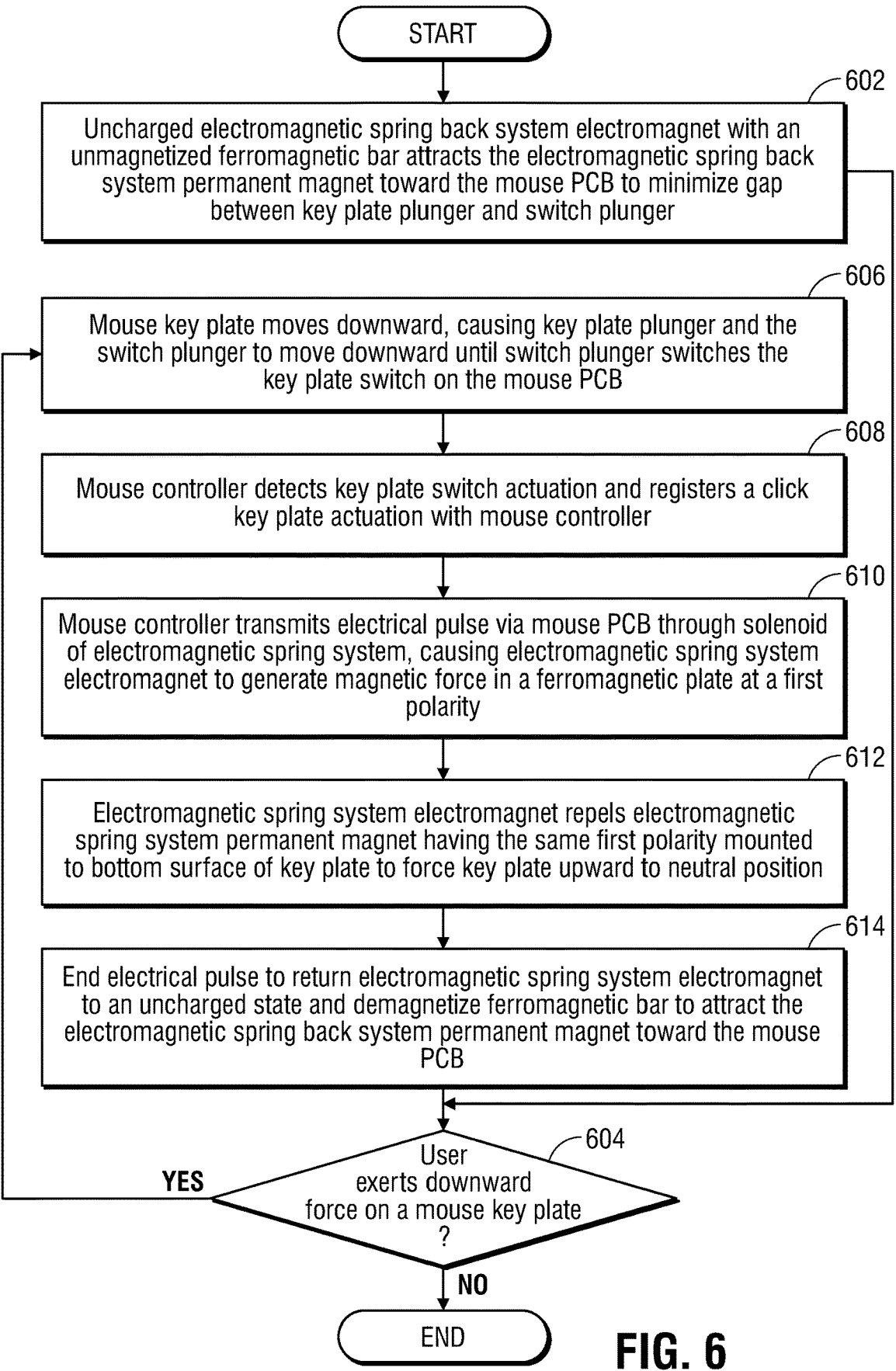

2 of an electromagnetic spring back system for a key plate switch according to an embodiment of the present disclosure;

FIG. 5 is a flow diagram illustrating a method of assembling an electromagnetic spring back rapid click mouse according to an embodiment of the present disclosure; and FIG. 6 is a flow diagram illustrating a method of operating an electromagnetic spring back rapid click mouse to increase speed at which a mouse registers user finger clicks on a mouse key plate according to an embodiment of the present disclosure.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In gaming, the speed at which a mouse can accurately register key clicks of a mouse key plate, known as click speed, can affect user experience. Mice register key plate click actuations when a user presses down on a key plate on the top cover of the mouse, causing a key plate plunger beneath the key plate to press down on a switch plunger of a key plate switch. Downward force on the switch plunger may cause the switch plunger to come into electrically conductive contact with key plate switch operatively coupled to a mouse printed circuit board (PCB), and the mouse PCB may then transmit the key plate switch signal to register a key plate click actuation with a mouse controller for transmission to an information handling system. As the user lifts their finger, a spring within the switch plunger may push the key plate plunger back up. The rigidity of the key plate formed on a mouse top cover causes the mouse key plate to move upward and back to a neutral position. The user may not perform another key click until the switch plunger and the key plate have been returned to this neutral position. In some cases, the speed at which a user is capable of clicking the key plate may be faster than the speed at which the key plate travels downward to register a key click and returns to the neutral position following a click. This is partly due to a small gap between the keyplate and the switch plunger as well as the rebound time of the key plate after actuation. A solution is needed that decreases the length of time during which this process occurs, resulting in accurate and more rapid mouse clicks registration with a mouse key plate.

The electromagnetic spring back system for an electromagnetic spring back rapid click mouse in embodiments of the present disclosure address these issues by decreasing the distance the key plate plunger has to travel from the neutral position in order to contact and depress the switch plunger. In embodiments of the present disclosure, the electromagnetic spring back system may include an electromagnet mounted to the mouse PCB and a permanent magnet disposed on the underside of the key plate between the electromagnet and the key plate. When the mouse is placed in a neutral position, prior to a user's downward force on the key plate to register a click, the electromagnet may be uncharged. The electromagnet comprises a steel bar or a bar of some other ferromagnetic material and a solenoid coil operatively coupled to the mouse PCB to receive current.

When the solenoid coil is uncharged and without current, the ferromagnetic bar attracts the permanent magnet. This may cause the electromagnet to attract the permanent magnet downward, urging the key plate to which the permanent magnet is mounted underneath toward the mouse PCB or downward. The key plate plunger disposed beneath the key plate is also urged slightly downward and closer to the switch plunger of the key plate switch. Such an attractive force may eliminate any gap above the switch plunger as well as decrease the distance the key plate plunger must travel to contact and depress the switch plunger, consequently increasing the click speed in part.

In other aspects of embodiments of the present disclosure, the electromagnetic spring back system for an electromagnetic spring back rapid click mouse address these issues by increasing the speed at which the key plate returns to the neutral position following a click actuation. Once a click has been detected and registered from the key plate switch in embodiments, a controller on the mouse PCB may transmit an electrical pulse through the solenoid of the electromagnetic spring back system electromagnet to magnetize the ferromagnetic bar, such as a steel bar, with a polarity of the electromagnetic that is the same as the permanent magnet. Upon such magnetization of the electromagnetic with a polarity that is the same as the permanent magnet, the electromagnet may repel the permanent magnet mounted underneath the bottom surface of the key plate, urging the permanent magnet and key plate upward and back into the neutral position. This repellant force in embodiments may be greater than the spring force of the key plate formed in the mouse top cover and the spring force at which the switch plunger forces the key plate plunger back up in existing systems. Thus, the speed at which the electromagnetic spring back system returns the key plate to the neutral position may be greater than the speed at which the switch plunger in existing systems can return the key plate to the neutral position. In such a way, the electromagnetic spring back system in embodiments of the present disclosure may increase click speed for a mouse key plate by decreasing the distance the components must travel in order to register a key click and increasing the speed at which the components return to a neutral position for registration of a next click actuation.

Figure 1:
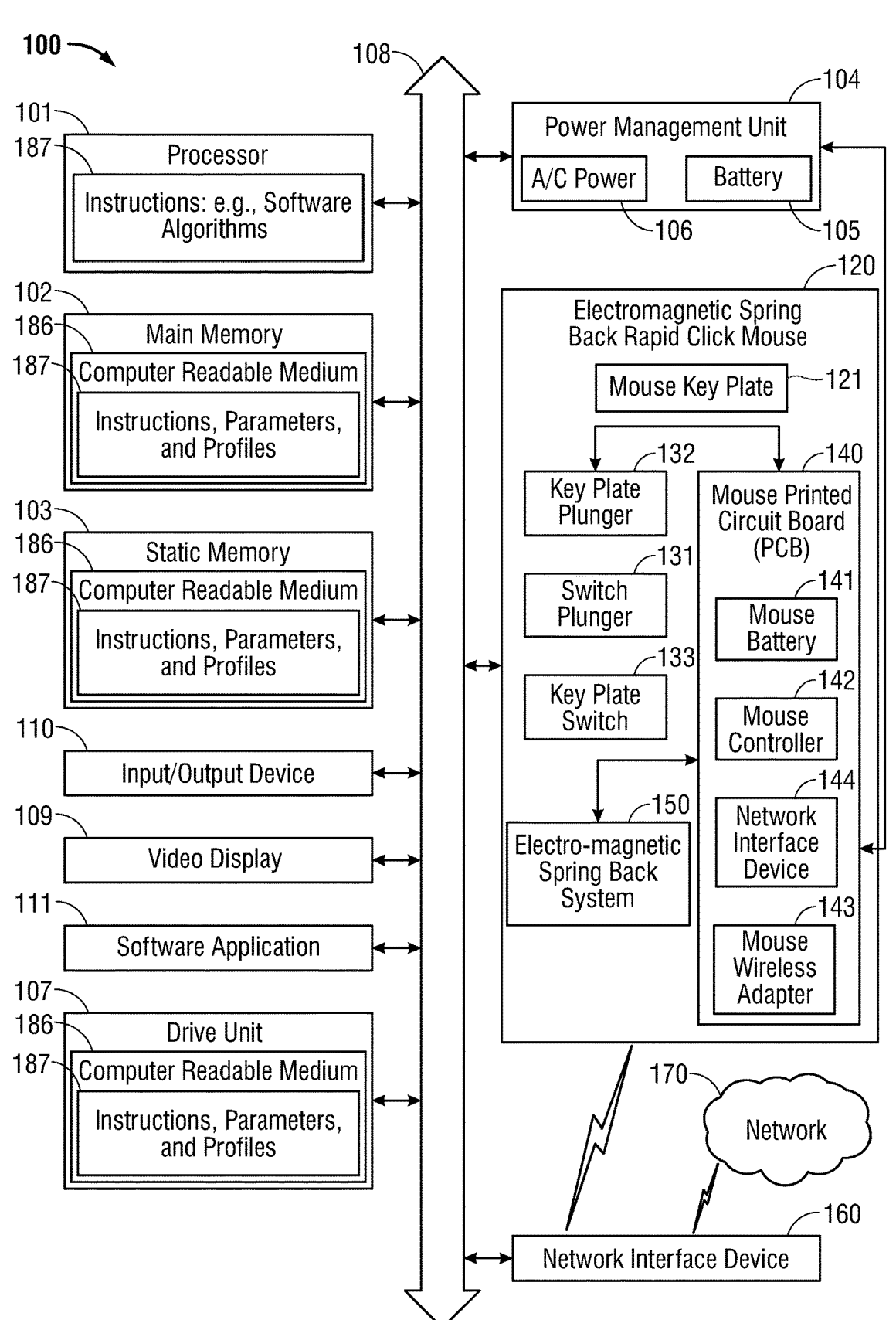
FIG. 1 is a block diagram illustrating an information handling system operatively coupled to an electromagnetic spring back rapid click mouse according to an embodiment of the present disclosure.

FIG. 1 illustrates an information handling system 100 according to several aspects of the present disclosure. In various embodiments described herein, an electromagnetic spring back rapid click mouse 120 may be operatively coupled to the information handling system 100 such that a software application 111 executing at the information handling system 100 may receive user input in the form of user mouse clicks at a more rapid click speed than existing systems. The electromagnetic spring back rapid click mouse 120 in an embodiment may comprise a key plate 121 formed on or in the top cover of the mouse 120 which may be depressed or clicked by the user, causing a key plate plunger 132 beneath the key plate to press down on a switch plunger 131 of a key plate switch 133. Downward force on the switch plunger 131 may cause the switch plunger 131 to come into electrically conductive contact with key plate switch 133 operatively coupled to a portion of the mouse printed circuit board (PCB) 140. The mouse controller or microcontroller unit (MCU) 142 mounted to the mouse PCB 140 in an embodiment may then register a click and transmit an indication of such a mouse click user input to the hardware processor 101 of the information handling system 100. The mouse PCB 140 in an embodiment may further operatively couple to a battery 141 and either a network interface device 143 or a wireless adapter 144. In some embodiments, the electromagnetic spring back rapid click mouse 120 may be a wired mouse operatively coupled to the information handling system 100 via a wired connection, such as a universal serial bus (USB) connection, with the network interface device 143. In other embodiments, the electromagnetic spring back rapid click mouse 120 may be a wireless mouse operatively coupled to the information handling system 100 via a wireless link established through the wireless adapter 144.

As described herein, an electromagnetic spring back rapid click mouse 120 in an embodiment may include the electromagnetic spring back system 150 for decreasing the distance the key plate plunger 132 has to travel from a neutral position in order to contact and depress the switch plunger 131 and how quickly the key plate 121 and switch plunger 131 are returned to a neutral position. In an embodiment, the electromagnetic spring back system 150 may include an electromagnet mounted to the mouse PCB 140 and a permanent magnet disposed under a bottom surface of the key plate 121 between the electromagnet and the key plate 121. When the mouse key plate 121 is placed in a neutral position, prior to a user's downward force on the key plate 121 to register a click actuation, the electromagnet may be uncharged, such that ferromagnetic bar in the electromagnet is not magnetized and attracts the permanent magnet. Thus, as the uncharged electromagnet attracts the permanent magnet downward, this causes the key plate 121 to which the permanent magnet is mounted, and the key plate plunger 132 disposed beneath the key plate 121 to move slightly downward. Such an attractive force may decrease the distance the key plate plunger 132 must travel to contact and depress the switch plunger 131, consequently increasing the click speed in part.

In another aspect of an embodiment, the electromagnetic spring back system 150 may increase the speed at which the key plate 121 returns to the neutral position following such a click. Once a click has been detected by the key plate switch 131 and registered, the mouse controller 142 on the mouse PCB 140 may transmit an electrical pulse through a solenoid of the electromagnetic spring back system 150 to magnetize the electromagnetic with a polarity that is the same as the permanent magnet. Upon such magnetization with the same polarity, the electromagnet may repel the permanent magnet mounted to the bottom surface of the key plate 121, forcing the permanent magnet and key plate 121 upward and back into the neutral position. This repellant force in an embodiment may be greater than the spring force of the key plate 121 of the mouse top cover rebounds and the spring force at which the switch plunger 131 forces the key plate plunger 132 upward in existing systems. Thus, the speed at which the electromagnetic spring back system 150 returns the key plate 121 to the neutral position is increased relative to the speed at which the switch plunger 131 in existing systems returns the key plate 121 to the neutral position. In such a way, the electromagnetic spring back system 150 in an embodiment may increase click speed for the electromagnetic spring back rapid click mouse 120 by decreasing the distance the keyplate 121 and other components must travel in order to register a key click and increasing the speed at which the key plate 121 and other components return to a neutral position for registration of a next click actuation.

In a networked deployment, the information handling system 100 may operate in the capacity of a server or as a client computer in a server-client network environment, or as a peer computer system in a peer-to-peer (or distributed)

network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, a mouse 120, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, wired or wireless mouse 120, or other components of an information handling system. Battery 105 or A/C power adapter 106 may be operatively coupled to the mouse battery 141 via an electrically conductive wire if the mouse 120 is wired. In an alternative embodiment, mouse 120 may be wireless and be powered with a mouse battery 141 that is rechargeable or a replaceable dry cell battery. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The wireless adapter and network interface device 160 may provide connectivity of the information handling system 100 to wireless peripheral devices such as electromagnetic spring back rapid click mouse 120 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. For example, wireless adapter and network interface device 160 may provide connectivity of the information handling system 100 to the electromagnetic spring back rapid click mouse 120 via its mouse wireless adapter 144 using a Bluetooth® or BLE wireless protocol in an embodiment. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
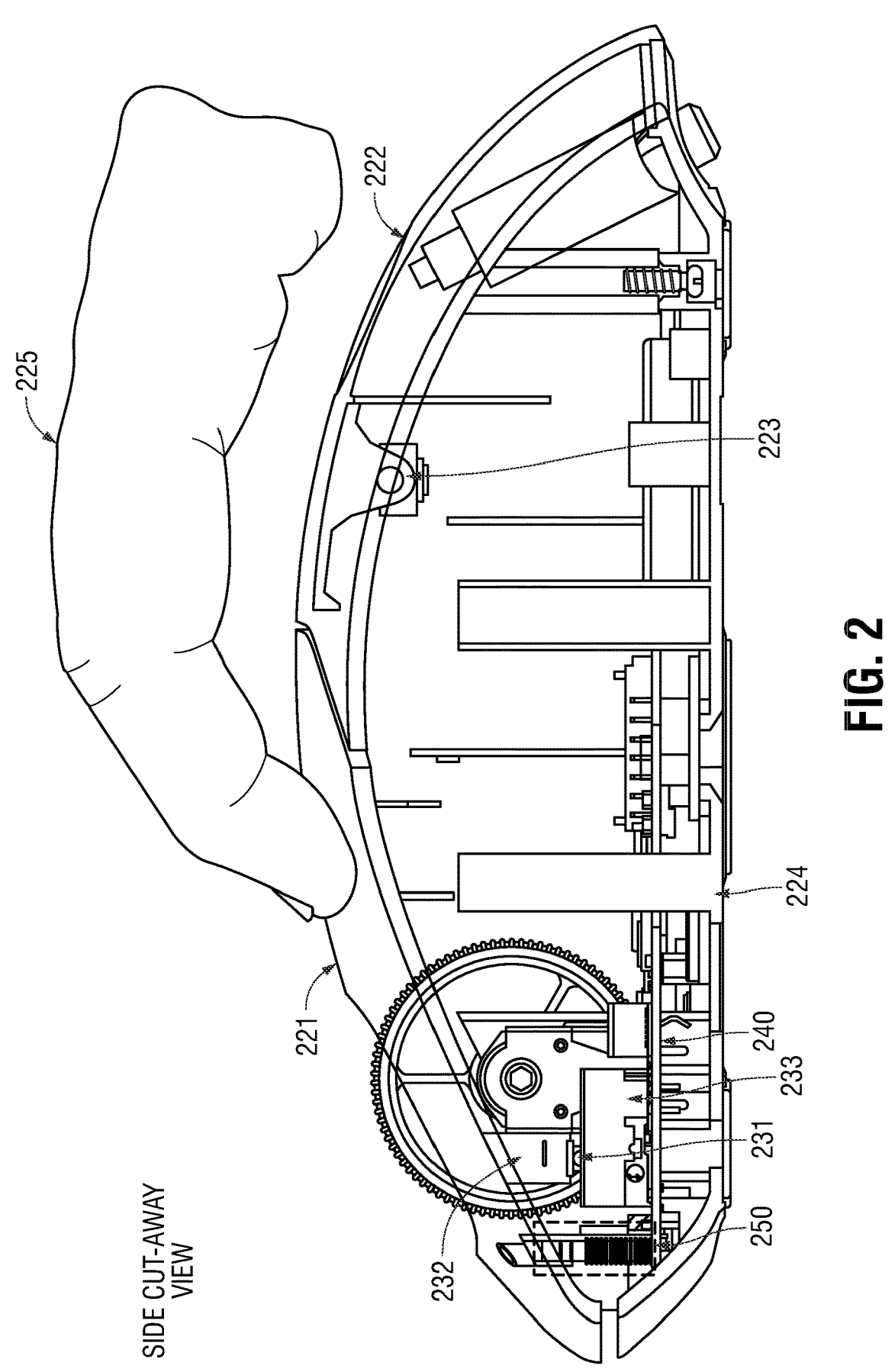
FIG. 2 is a graphical diagram illustrating a side cut-away view of an electromagnetic spring back rapid click mouse according to an embodiment of the present disclosure.

FIG. 2 is a graphical diagram illustrating a side cut-away view of an electromagnetic spring back rapid click mouse with increased click speed according to an embodiment of the present disclosure. A mouse key plate 221 in an embodiment may be operatively coupled to a mouse top cover 222 such that the mouse key plate 221 can move downward with respect to the mouse top cover 222 upon downward pressure by a user's finger 225. More specifically, the mouse key plate 221 in an example embodiment may be operatively coupled to a mouse top cover 222 via hinge 223. Hinge 223 may allow the mouse key plate 221 to move freely upon click actuation in some embodiments. A mouse printed circuit board (PCB) 240 in an embodiment may be mounted to a mouse base housing 224. The mouse PCB 240 may have a key plate switch 233 with a switch plunger 231 for coming into electrical contact with the key plate switch 233 upon downward pressure by the user's finger 225 on the key plate 221.

The key plate plunger 232 in an embodiment may be mounted to or formed into the bottom surface of the key plate 221, such that it is disposed directly atop the switch plunger 231. Downward pressure on the mouse key plate 221 causes downward movement of the key plate plunger 232 and the switch plunger 231. The key plate switch 233 may be operatively coupled to the mouse PCB 240 and to the switch plunger 231 such that depression of the switch plunger 231 causes electrically conductive contact between the switch plunger 231 the key plate switch 233 on the mouse PCB 240 to detect a click actuation in an embodiment. Upon downward pressure of the user's finger 225 in an embodiment, the mouse key plate 221 may move downward, causing the key plate plunger 232 to move downward and to move downward the switch plunger 231 to actuate the key plate switch 233.

The switch plunger 231 in an embodiment may be spring loaded to apply a constant upward force that must be overcome by the user's downward force 225 on the key plate 221 in order to trigger the key plate switch 233 and to register a key plate click actuation with a mouse controller via the mouse PCB. This constant upward spring-loaded pressure from the switch plunger 231 in an embodiment may return the switch plunger 231 to a neutral position and also push the key plate plunger 232 upward in the absence of the user's downward force 225, to push the key plate 221 back into a neutral position. As described herein, the user may not perform another key click until the switch plunger 231 and the key plate 221 has been returned to this neutral position. In some cases, the speed at which a user is capable of clicking the key plate 221 may be faster than the speed at which the key plate 221 travels downward to register a key click and returns to the neutral position following a click. An electromagnetic spring back system 250 for an electromagnetic spring back rapid click mouse 220 in an embodiment both decreases the distance the key plate plunger 232 has to travel from the neutral position in order to contact and depress the switch plunger 231 by eliminating any gap between the two via a magnetic attraction as discussed in embodiments herein. In another aspect of an embodiment, the electromagnetic spring back system 250 for an electromagnetic spring back rapid click mouse 220 may increase the speed at which the key plate 221 returns to the neutral position following such a click due to current pulse of an electromagnet of electromagnetic spring back system 250 via generating a repelling force with a permanent magnet to return key plate 221 to the neutral position as discussed in embodiments herein.

Figure 3:
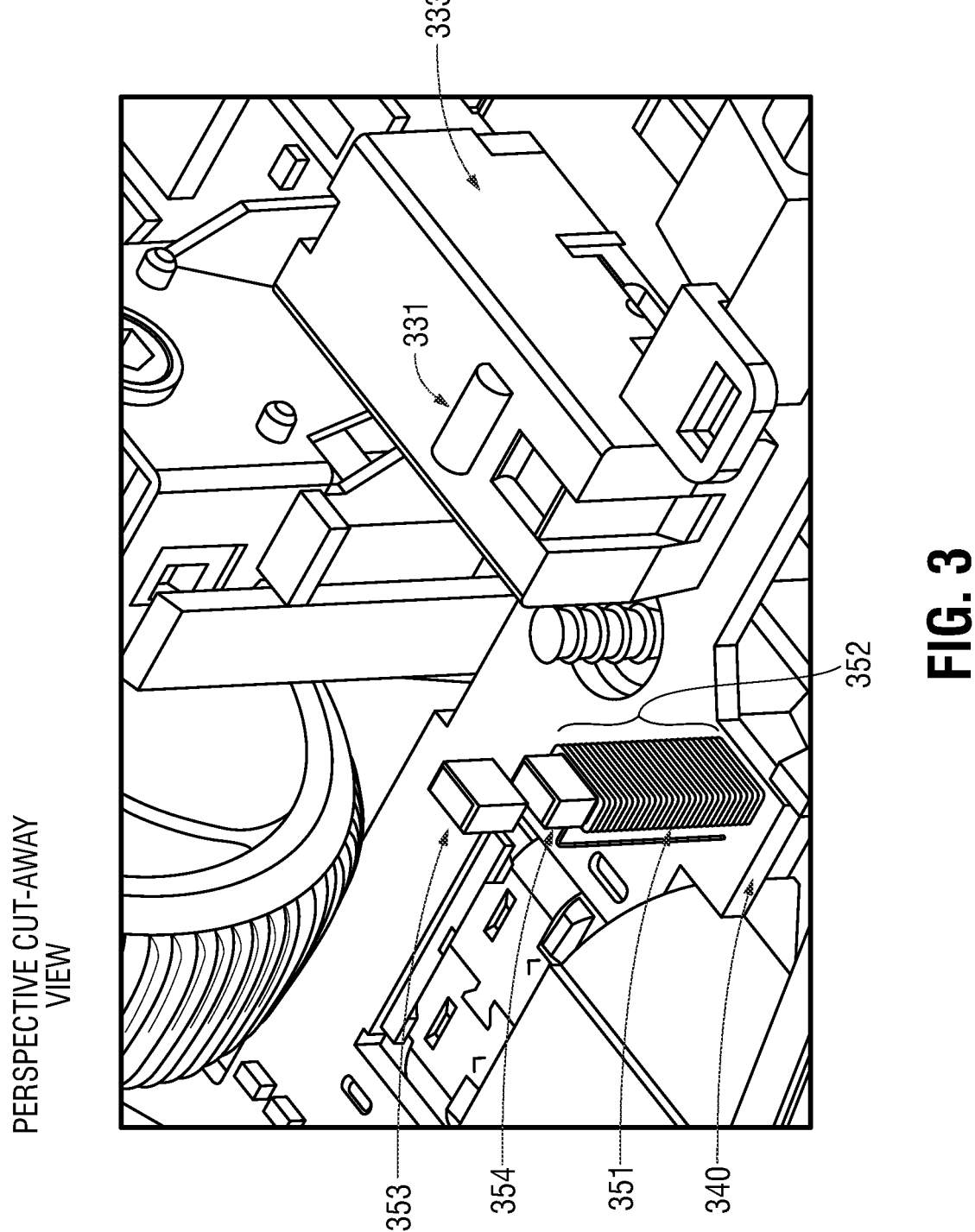
FIG. 3 is a graphical diagram illustrating a perspective view of an electromagnetic spring back system for an electromagnetic spring back rapid click mouse according to an embodiment of the present disclosure.

FIG. 3 is a graphical diagram illustrating a perspective view of an electromagnetic spring back system and key plate switch for increasing speed at which a mouse registers user finger clicks according to an embodiment of the present disclosure. As described herein, an electromagnetic spring back system (e.g., 250 from FIG. 2) includes an electromagnet 352 with a ferromagnetic bar 354, such as a steel bar, disposed within a solenoid 351 and mounted beneath a permanent magnet 353 in an embodiment. The electromagnet 352 with the ferromagnetic bar 354 may decrease the distance the key plate plunger has to travel from the neutral position in order to contact and depress the switch plunger to register a mouse click when solenoid 351. Magnetic attraction between permanent magnet 353 and the ferromagnetic bar 354 which is not magnetized when not receiving any current pulse may urge the keyplate plunger downward toward the switch plunger 331 to decrease any distance required for a click actuation. An electromagnetic spring back system electromagnet 352 may be operatively coupled to the mouse PCB 340 in an embodiment such that an electrical pulse emitted by the mouse PCB 340 to the solenoid coil 351 of the electromagnet 352 causes the electromagnet 352 to magnetize ferromagnetic bar 354 with a first polarity (e.g., N) that is the same polarity as permanent magnet 353 to repel the permanent magnet 353 and increase the speed at which the key plate returns to the neutral position following such a click actuation. The absence of such a current pulse at the electromagnet solenoid coil 351 demagnetizes the ferromagnetic bar 354 of the electromagnet 352 such that the permanent magnet is attracted to the ferromagnetic bar 354 of the electromagnet 352. In embodiments herein, the ferromagnetic bar 354 may be a steel bar or any other ferromagnetic material that may be magnetized by solenoid coil 351 receiving current pulses.

An electromagnetic spring back system permanent magnet 353 in an embodiment has a first polarity (e.g., N) and may be mounted beneath a key plate (221 of FIG. 2) and directly above the electromagnetic spring back system electromagnet 352 and ferromagnetic bar 354. In an embodiment, the permanent magnet 353 may be mounted such that, upon application of an electrical pulse by the mouse PCB 340 to the solenoid coil 351 of the electromagnetic spring back system electromagnet 352, the electromagnetic spring back system electromagnet 352 magnetizes the ferromagnetic bar 354 with the same polarity to repel the electromagnetic spring back system permanent magnet 353 from its magnetic field. This may cause upward force on the electromagnetic spring back system permanent magnet 353 and consequently on the key plate (221 of FIG. 2), to place the key plate in a neutral position where the user may apply the next click actuation. The repelling force between the electromagnetic spring back system permanent magnet 353 and the magnetized ferromagnetic bar 354 of the charged electromagnetic spring back system electromagnet 352 in an embodiment return the key plate to a neutral position quickly and allow a spring-loaded portion of the switch plunger 331 of key plate switch 333 to also quickly return to the neutral position. Thus, the speed at which the repellant force causes the key plate (221 of FIG. 2) to return to the neutral position may be greater than the speed at which key plate system could be returned to a neutral position.

In the absence of an electrical pulse by the mouse PCB 340 to the electromagnetic spring back system electromagnet 352, the ferromagnetic bar 354 is demagnetized and attracts the electromagnetic spring back system permanent magnet 353 downward and toward the mouse PCB 340. This may pull the key plate (221 of FIG. 2) and key plate plunger (232 of FIG. 2) downward again to decrease a distance between a key plate plunger (232 of FIG. 2) and the switch plunger 331, and increase the speed at which mouse clicks may be registered. The attractive force between the electromagnetic spring back system permanent magnet 353 and the uncharged ferromagnetic bar 354 of the electromagnetic spring back system electromagnet 352 pulling the mouse key plate in a neutral position in an embodiment may be less than a magnitude of downward force required on the switch plunger 331 to actuate the key plate switch 333 on the mouse PCB 340 with the switch plunger 331. This may avoid erroneous detection of mouse clicks when the user has not depressed the key plate but provide for quicker click actuations.

Figure 4:
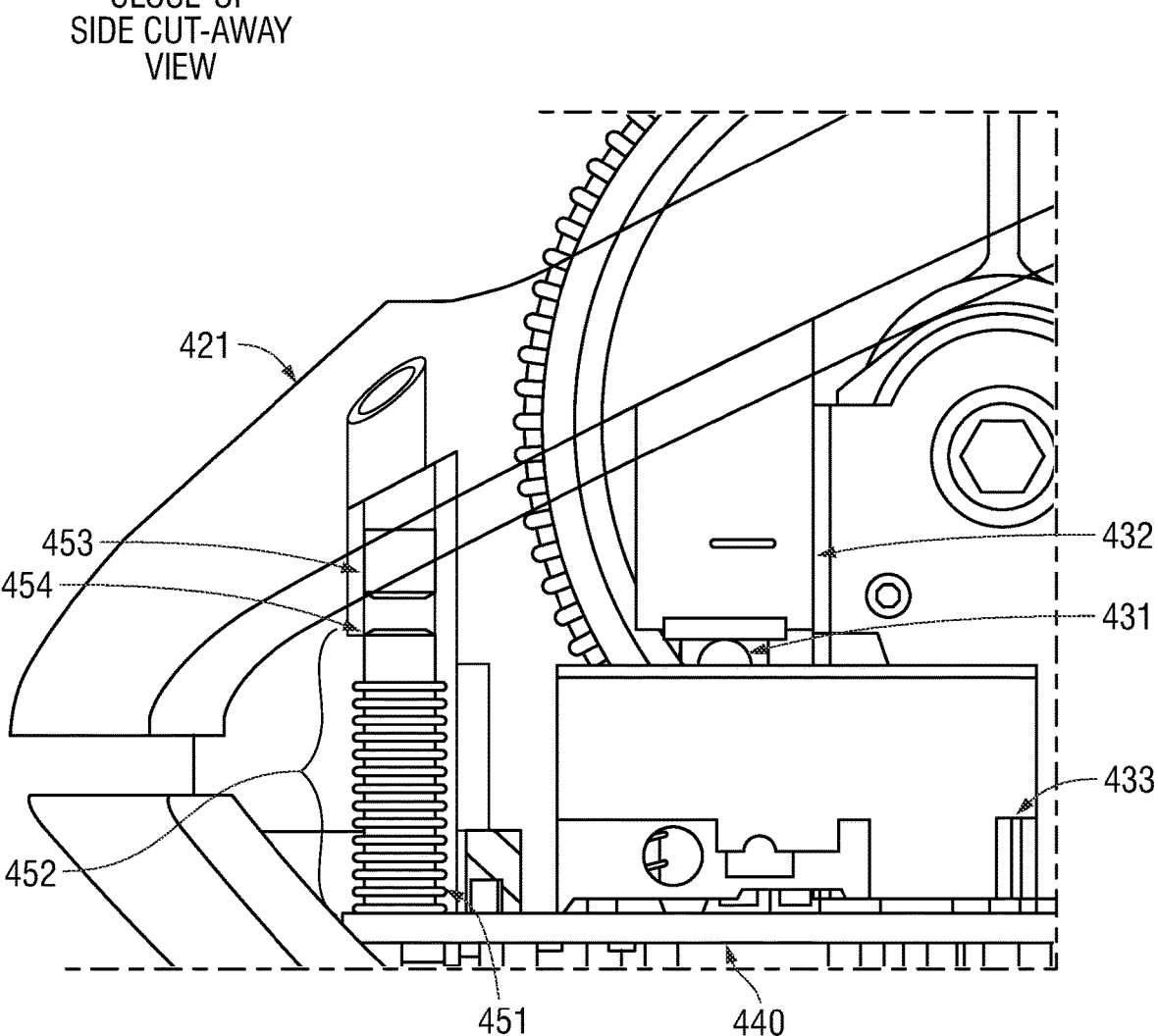
FIG. 4 is a graphical diagram illustrating a close-up side cut-away view of an electromagnet and permanent magnet

FIG. 4 is a graphical diagram illustrating a close-up side cut-away view of an electromagnet and permanent magnet of an electromagnetic spring back system and a key plate switch of a mouse using magnetic attraction and repulsion to increase the speed at which the mouse registers user finger clicks according to an embodiment of the present disclosure. The key plate plunger 432 in an embodiment may be mounted to or formed under the key plate 421 such that it is disposed directly above the switch plunger 431 of the key plate switch 433. Downward pressure on the mouse key plate 421 causes downward movement of the key plate plunger 432 and the switch plunger 431 to actuate the key plate switch 433 during a click actuation. The key plate switch 433 may be operatively coupled to the mouse PCB 440 and to the switch plunger 431 such that depression of the switch plunger 431 registers a key plate click actuation with a controller operatively coupled to the mouse printed circuit board (PCB) 440 in an embodiment. The mouse PCB 440 in an embodiment may detect electrically the key plate switch 433 being actuated with the switch plunger 431, causing the controller operatively connected to the PCB 440 to register a mouse click actuation.

An electromagnetic spring back system electromagnet 452 may be operatively coupled to the mouse PCB 440 in an embodiment such that an electrical pulse may be transmitted by the mouse PCB 440 from a mouse power source and mouse power management unit (PMU) to a solenoid coil 351 of the electromagnet 452 upon the controller registering a mouse click. This may cause the electromagnet 452 to magnetize a ferromagnetic bar 454 with a first polarity (e.g., N) where the absence of such an electrical pulse may cause the electromagnet 452 to demagnetize the ferromagnetic bar 454. An electromagnetic spring back system permanent magnet 453 in an embodiment having the same first polarity (e.g., N) may be mounted beneath the key plate 421 and directly above the electromagnetic spring back system electromagnet 452. In an embodiment, the permanent magnet 453 may be mounted such that, upon application of an electrical pulse by the mouse PCB 440 to the solenoid 451 surrounding ferromagnetic bar 454 of the electromagnetic spring back system electromagnet 452, the electromagnetic spring back system electromagnet 452 magnetizes the ferromagnetic bar 454 to repel the electromagnetic spring back system permanent magnet 453. When the electrical pulse is removed from solenoid coil 451, the demagnetized ferromagnetic bar 454 of the electromagnetic spring back system electromagnet 452 attracts the electromagnetic spring back system permanent magnet 453 downward.

The repelling force between the magnetized ferromagnetic bar 454 of a charged electromagnetic spring back system electromagnet 452 and the electromagnetic spring back system permanent magnet 453 in an embodiment may cause upward force on the electromagnetic spring back system permanent magnet 453 and consequently upward motion of the key plate 421, to quickly place the key plate 421 in a neutral position where the user may apply the next click actuation. The repelling force between the electromagnetic spring back system permanent magnet 453 and the charged electromagnetic spring back system electromagnet 452 in an embodiment may be greater than a magnitude of upward force of a spring-loaded portion of the switch plunger 431. Thus, the speed at which the repellant force causes the key plate 421 to return to the neutral position, as well as the switch plunger to return to an unactuated position is thus increased relative to previous key plate switch systems.

The attractive force between the demagnetized ferromagnetic bar 454 of an uncharged electromagnetic spring back system electromagnet 452 and the electromagnetic spring back system permanent magnet 453 in an embodiment may pull the key plate 421 and key plate plunger 432 downward to decrease a distance between the key plate plunger 432 and the switch plunger 431 in the neutral position to additionally increase the speed at which mouse clicks may be registered. The attractive force between the electromagnetic spring back system permanent magnet 453 and the demagnetized ferromagnetic bar 454 of the uncharged electromagnetic spring back system electromagnet 452 of the mouse in a neutral position in an embodiment may be less than a magnitude of downward force required on the switch plunger 431 to actuate the key plate switch 433 on the mouse PCB 440 to register a key plate click actuation. This may avoid erroneous detection of mouse clicks when the user has not depressed the key plate 421.

FIG. 5 is a flow diagram illustrating a method of assembling an electromagnetic spring back rapid click mouse with increased click speed according to an embodiment of the present disclosure. As described herein, an electromagnetic spring back system for an electromagnetic spring back rapid click mouse in an embodiment may decrease the distance the key plate plunger has to travel from the neutral position in order to contact and depress the switch plunger of a key plate switch and increase the speed at which the key plate returns to the neutral position following such a click actuation.

At block 502, a mouse key plate may be operatively coupled to or formed into a mouse top cover such that the mouse key plate can move downward with respect to mouse top cover upon downward pressure by a user's finger in an embodiment. For example, in an embodiment described with reference to FIG. 2, a mouse key plate 221 may be operatively coupled to a mouse top cover 222 such that the mouse key plate 221 can move downward with respect to the mouse top cover 222 upon downward pressure by a user's finger 225. More specifically, the mouse key plate 221 in an example embodiment may be operatively coupled to a mouse top cover 222 via hinge 223.

A mouse printed circuit board (PCB) in an embodiment at block 504 may be mounted to a mouse base housing having a key plate switch and a mouse controller for detecting electrically conductive contact with a switch plunger of a keyplate actuation. Mouse PCB may be operatively coupled to a power source, the electromagnetic spring back system solenoid, and wireless adapter or network interface device. For example, in an embodiment described with reference to FIG. 1, the mouse PCB 140 may operatively couple to a battery 141 and either a network interface device 143 or a wireless adapter 144. In some embodiments, the electromagnetic spring back rapid click mouse 120 may be a wired mouse operatively coupled to the information handling system 100 via a wired connection, such as a USB connection, with the network interface device 143. In other embodiments, the electromagnetic spring back rapid click mouse 120 may be a wireless mouse operatively coupled to the information handling system 100 via a wireless link established through the wireless adapter 144. Downward force on the switch plunger 131 in an embodiment may cause the switch plunger 131 to come into electrically conductive contact for actuation of a key plate switch 133 on a portion of the mouse PCB 140. The mouse controller or microcontroller unit (MCU) 142 mounted to the mouse PCB 140 in such an embodiment may then receive the key plate switch 133 signal of an actuation and register a click actuation. The mouse controller or microcontroller unit (MCU) 142 transmits an indication of such a mouse click user input to the hardware processor 101 of the information handling system 100 via either a network interface device 143 or a wireless adapter 144.

In another example embodiment described with reference to FIG. 2, a mouse PCB 240 may be mounted to a mouse base housing 224. Mouse PCB 240 may have a key plate switch 233 for receiving actuation from a switch plunger 231 upon downward pressure by the user's finger 225 on the key plate 221. The key plate switch 233 may record the click actuation and register the same with a mouse controller on the mouse PCB 240. In yet another example embodiment described with reference to FIG. 4, the mouse PCB 440 may detect electrically conductive contact to trigger key plate switch 433 with a switch plunger 431, causing the controller operatively connected to key plate switch 433 via the PCB 440 to register a mouse click actuation.

At block 506, a key plate switch may be operatively coupled to the mouse PCB and to the switch plunger such that depression of the switch plunger causes electrically conductive contact to actuate the key plate switch and provide a signal to a mouse controller on the mouse PCB in an embodiment. For example, in an embodiment described with respect to FIG. 1, downward force on the switch plunger 131 may cause the switch plunger 131 to actuate the key plate switch 133 to send a key plate click actuation signal to a mouse controller 142 on the mouse printed circuit board (PCB) 140. In another example embodiment described with reference to FIG. 2, a key plate switch 233 may be operatively coupled to the mouse PCB 240 and to the switch plunger 231 such that depression of the switch plunger 231 switches the key plate switch from contact by the switch plunger 231 and a key plate click actuation signal is sent to the mouse controller on the mouse PCB 240. In yet another example embodiment described with reference to FIG. 4, a key plate switch 433 may be operatively coupled to the mouse PCB 440 and to the switch plunger 431 such that depression of the switch plunger 431 switches the key plate switch 433 to register the key plate click actuation with a mouse controller on a mouse printed circuit board (PCB) 440.

The key plate plunger in an embodiment at block 508 may be mounted to the key plate such that it is disposed directly atop the switch plunger and such that downward pressure on the mouse key plate causes downward movement of the key plate plunger and the switch plunger to actuate a key plate switch. For example, in an embodiment described with respect to FIG. 1, the electromagnetic spring back rapid click mouse 120 may comprise a key plate 121 on the top cover of the mouse 120 which may be depressed or clicked by the user, causing a key plate plunger 132 beneath the key plate to press down on a switch plunger 131 and actuate key plate switch 133. In another example embodiment described with reference to FIG. 2, the key plate plunger 232 may be mounted to the bottom surface of the key plate 221, such that it is disposed directly atop the switch plunger 231, and downward pressure on the mouse key plate 221 causes downward movement of the key plate plunger 232 and the switch plunger 231 into key plate switch 233. In yet another example embodiment described with reference to FIG. 4, the key plate plunger 432 may be mounted underneath the key plate 421 such that it is disposed directly atop the switch plunger 431 and such that downward pressure on the mouse key plate 421 causes downward movement of the key plate plunger 432 and the switch plunger 431 to actuate key plate switch 433 on mouse PCB 440.

At block 510, an electromagnetic spring back system electromagnet may be operatively coupled to the mouse PCB in an embodiment such that an electrical pulse emitted by the mouse PCB to a solenoid coil of the electromagnet causes the electromagnet to magnetize a ferromagnetic bar, such as a steel bar, to a first polarity and the absence of such an electrical pulse in the solenoid causes the ferromagnetic bar to be demagnetized. For example, in an embodiment described with respect to FIG. 1, when the mouse is placed in a neutral position, prior to a user's downward force on the key plate 121 to register a click, the electromagnet may be uncharged, such that a ferromagnetic bar is demagnetized and attracts the permanent magnet. This may cause the electromagnet to attract the permanent magnet downward, causing the key plate 121 to which the permanent magnet is mounted, and the key plate plunger 132 disposed beneath the key plate 121 to move slightly downward. Such an attractive force may decrease the distance the key plate plunger 132 must travel to contact and depress the switch plunger 131 and actuate the key plate switch 133, consequently increasing the click speed.

In another example embodiment described with respect to FIG. 3, a solenoid coil 351 of an electromagnetic spring back system electromagnet 352 may be operatively coupled to the mouse PCB 340 such that an electrical pulse emitted by the mouse PCB 340 to solenoid coil 351 magnetizes a ferromagnetic bar 354 of the electromagnet 352 with a first polarity (e.g., N) to repel the permanent magnet 353. The absence of such an electrical pulse causes the electromagnet 352 demagnetize the ferromagnetic bar 354 which may then attract the permanent 353 for the key plate in a neutral position. The attractive force between the electromagnetic spring back system permanent magnet 353 and demagnetized ferromagnetic bar 354 of the uncharged electromagnetic spring back system electromagnet 352 in a neutral key plate position in an embodiment may be less than a magnitude of downward force required on the switch plunger 331 to switch the key plate switch 333 and register a key plate click actuation at a mouse controller via the mouse PCB 340. This may avoid erroneous detection of mouse clicks when the user has not depressed the key plate.

In yet another example embodiment described with reference to FIG. 4, an electromagnetic spring back system electromagnet 452 may be operatively coupled to the mouse PCB 440 such that an electrical pulse may be emitted by the mouse PCB 440 to the solenoid coil 451 of the electromagnet 452 upon the controller registering a mouse click. This may cause the electromagnet 452 to magnetize the ferromagnetic bar 454 at a first polarity (e.g., N) that is the same polarity of the permanent magnet 453 operatively coupled underneath the click plate 421 to repel the permanent magnet 453. Further, the absence of such an electrical pulse at the solenoid coil 451 may demagnetize the ferromagnetic bar 454 to attract the permanent magnet 453 when the key plate has returned to a neutral position.

An electromagnetic spring back system permanent magnet in an embodiment at block 512 having the first polarity may be operatively coupled beneath the key plate and directly above the electromagnetic spring back system electromagnet. In an embodiment, the permanent magnet may be mounted such that, upon application of an electrical pulse by the mouse PCB to a solenoid coil of the electromagnetic spring back system electromagnet, the electromagnetic spring back system electromagnet magnetizes a ferromagnetic bar to repel the electromagnetic spring back system permanent magnet. Further, upon lack of an electrical pulse by the mouse PCB to the solenoid coil of the electromagnetic spring back system electromagnet, the ferromagnetic bar of the electromagnetic spring back system electromagnet attracts the electromagnetic spring back system permanent magnet toward the mouse PCB.

For example, in an embodiment described with reference to FIG. 1, the electromagnetic spring back system 150 may include permanent magnet operatively coupled underneath the key plate 121 such that its magnetic field magnetically interacts with an electromagnet mounted to the mouse PCB 140. When the mouse key plate is placed in a neutral position, prior to a user's downward force on the key plate 121 to register a click, the electromagnet may be uncharged, such that a ferromagnetic bar of the electromagnet is demagnetized and attracts the permanent magnet. This may cause the electromagnet to attract the permanent magnet downward, causing the key plate 121 to which the permanent magnet is mounted, and the key plate plunger 132 disposed beneath the key plate 121 to move slightly downward. Such an attractive force may decrease the distance the key plate plunger 132 must travel to contact and depress the switch plunger 131 and actuate the key switch 133, consequently increasing the click speed.

In another aspect of an embodiment, the electromagnetic spring back system 150 may increase the speed at which the key plate 121 returns to the neutral position following such a click. Once a click has been registered, the controller 142 on the mouse PCB 140 may transmit an electrical pulse through a solenoid of the electromagnetic spring back system 150 magnetize the ferromagnetic bar of the electromagnetic to a first polarity that is the same as the permanent magnet. Upon such an electrical pulse, the electromagnet may repel the permanent magnet mounted to the bottom surface of the key plate 121, forcing the permanent magnet and key plate 121 upward and back into the neutral position. Thus, the speed at which the electromagnetic spring back system 150 returns the key plate 121 to the neutral position is increased to reset key plate 121 and the switch plunger 131 to the neutral position for faster rebound for a next click actuation than previous key plate switch systems. In such a way, the electromagnetic spring back system 150 in an embodiment may increase click speed for the electromagnetic spring back rapid click mouse 120 by decreasing the distance the components must travel in order to register a key click and increasing the speed at which the components return to a neutral position for registration of a next click.

In another example embodiment described with reference to FIG. 3, an electromagnetic spring back system permanent magnet 353 having the first polarity (e.g., N) may be operatively coupled beneath a key plate (221 of FIG. 2) and directly above the electromagnetic spring back system electromagnet 352. In an embodiment, the permanent magnet 353 may be mounted such that, upon application of an electrical pulse by the mouse PCB 340 to a solenoid coil 351 of the electromagnetic spring back system electromagnet 352, the electromagnetic spring back system electromagnet 352 magnetizes a ferromagnetic bar 354 and repels the electromagnetic spring back system permanent magnet 353. This may cause upward force on the key plate (221 of FIG. 2) to place the key plate in a neutral position where the user may apply the next click. Thus, the speed at which the repellant force causes the key plate (221 of FIG. 2) to return to the neutral position may provide for a faster rebound than previous system such that the key plate returning to the neutral position allows for a sooner next key plate click actuation for faster plural key plate click actuations during use.

In the absence of an electrical pulse by the mouse PCB 340 to solenoid coil 352 of the electromagnetic spring back system electromagnet 352, the electromagnetic spring back system electromagnet 352 may demagnetize the ferromagnetic bar 354 to attract the electromagnetic spring back system permanent magnet 353 downward and toward the mouse PCB 340. This occurs when the key plate has returned to the neutral position. This may decrease a distance between a key plate plunger (232 of FIG. 2) and the switch plunger 331, and increase the speed at which mouse clicks may be registered by the key plate switch 333. The attractive force between the electromagnetic spring back system permanent magnet 353 and the uncharged electromagnetic spring back system electromagnet 352 of the mouse in a neutral position in an embodiment may be less than a magnitude of downward force required on the switch plunger 331 to cause electrically conductive contact between the mouse PCB 340 and the switch plunger 331 to actuation the key plate switch 333. This may avoid erroneous detection of mouse clicks when the user has not depressed the key plate.

In another example embodiment described with reference to FIG. 4, an electromagnetic spring back system permanent magnet 453 having the first polarity (e.g., N) may be operatively coupled beneath the key plate 421 and directly above the electromagnetic spring back system electromagnet 452. In an embodiment, the permanent magnet 453 may be mounted such that, upon application of an electrical pulse by the mouse PCB 440 to solenoid coil 451 of the electromagnetic spring back system electromagnet 452, the electromagnetic spring back system electromagnet 452 magnetizes the ferromagnetic bar 454 to repel the electromagnetic spring back system permanent magnet 453 for faster rebound of the haptic plate. After the key plate click actuation and upon lack of such an electrical pulse to the solenoid coil 451, the electromagnetic spring back system electromagnet 452 demagnetizes the ferromagnetic bar 454 and attracts the electromagnetic spring back system permanent magnet 453 downward to reduce the travel distance of the key plate 421 to switch the key plate switch 433.

In such a way, the electromagnetic spring back system for an electromagnetic spring back rapid click mouse in an embodiment may decrease the distance the key plate plunger has to travel from the neutral position in order to contact and depress the switch plunger and increase the speed at which the key plate returns to the neutral position following such a click. The method for assembling an electromagnetic spring back rapid click mouse with increased click speed may then end.

FIG. 6 is a flow diagram illustrating a method of an electromagnetic spring back rapid click mouse increasing speed at which a mouse registers user's click actuation of a key plate according to an embodiment of the present disclosure. As described herein, an electromagnetic spring back system for an electromagnetic spring back rapid click mouse in an embodiment may increase mouse click speed by decreasing the distance the key plate plunger has to travel from the neutral position in order to contact and depress the switch plunger and by increasing the speed at which the key plate returns to the neutral position following such a key plate click actuation.

At block 602, the electromagnetic spring back system electromagnet in an embodiment may attract the electromagnetic spring back system permanent magnet toward the mouse printed circuit board (PCB) to minimize gap between key plate plunger and switch plunger in an uncharged state. For example, in an embodiment described with reference to FIG. 1, an electromagnetic spring back rapid click mouse 120 in an embodiment may include the electromagnetic spring back system 150 for decreasing the distance the key plate plunger 132 has to travel from a neutral position in order to contact and depress the switch plunger 131. In an embodiment, the electromagnetic spring back system 150 may include an electromagnet mounted to the mouse PCB 140 and a permanent magnet disposed between the electromagnet and the key plate 121. When the mouse is placed in a neutral position, prior to a user's downward force on the key plate 121 to register a click, the electromagnet may be uncharged, such that no current travels in a solenoid coil and the ferromagnetic bar of the electromagnet attracts the permanent magnet. This may cause the electromagnet to attract the permanent magnet downward, causing the key plate 121 to which the permanent magnet is mounted, and the key plate plunger 132 disposed beneath the key plate 121 to move slightly downward. Such an attractive force may decrease the distance the key plate plunger 132 must travel to contact and depress the switch plunger 131 and to switch the key plate switch 133, consequently increasing the click speed in part.

As described in an example embodiment with respect to FIG. 3, in the absence of an electrical pulse by the mouse PCB 340 to a solenoid coil 351 of the electromagnetic spring back system electromagnet 352, the electromagnetic spring back system electromagnet 352 demagnetize the ferromagnetic bar 354 such that it attracts the electromagnetic spring back system permanent magnet 353 downward and toward the mouse PCB 340. This may decrease a distance between a key plate plunger (232 of FIG. 2) and the switch plunger 331, and increase the speed at which mouse clicks may be registered. The attractive force between the electromagnetic spring back system permanent magnet 353 and the uncharged electromagnetic spring back system electromagnet 352 of the mouse in a neutral position in an embodiment may be less than a magnitude of downward force required on the switch plunger 331 to cause the switch plunger 331 to switch the key plate switch 333.

In yet another example embodiment described with respect to FIG. 4, the attractive force between the uncharged electromagnetic spring back system electromagnet 452 and the electromagnetic spring back system permanent magnet 453 may pull the key plate 421 and key plate plunger 432 downward to decrease a distance between the key plate plunger 432 and the switch plunger 431, and increase the speed at which mouse clicks may be registered. The attractive force between the electromagnetic spring back system permanent magnet 453 and the demagnetized ferromagnetic bar 454 of the uncharged electromagnetic spring back system electromagnet 452 of the mouse in a neutral position in an embodiment may be less than a magnitude of downward force required on the switch plunger 431 to cause the switch plunger 431 to switch the key plate switch 433. This may avoid erroneous detection of mouse clicks when the user has not depressed the key plate 421.

In an embodiment at block 604, a user may or may not apply downward force on the electromagnetic spring back rapid click mouse key plate to register a mouse click. Such a downward force may move the key plate downward from its neutral position, and consequently push the key plate plunger and switch plunger downward. Depression of the switch plunger in such a way may, in turn, switch a key plate switch on the mouse PCB to which the keyboard controller may receive the key plate switch actuation signal and register a mouse click. If the user does not apply a downward force on the key plate, the electromagnetic spring back rapid click mouse may remain in a neutral position in which no electrical pulse is transmitted to the electromagnetic spring back system, and the method may then end although the system may start over and monitor for a key plate click actuation at block 602. If the user does apply a downward force on the key plate, the method may proceed to block 606 for the key plate switch to receive the key plate click actuation via the via the key plate plunger and the switch plunger.

At block 606, the mouse key plate in an embodiment may move downward, causing the key plate plunger and the switch plunger to move downward until the switch plunger switches the key plate switch on the mouse PCB. For example, in an embodiment described with reference to FIG. 1, the electromagnetic spring back rapid click mouse 120 in an embodiment may comprise a key plate 121 on the top cover of the mouse 120 which may be depressed or clicked by the user, causing a key plate plunger 132 beneath the key plate to press down on a switch plunger 131. Downward force on the switch plunger 131 may cause the switch plunger 131 to contact and switch the key plate switch 133 on a portion of the mouse printed circuit board (PCB) 140. In another example embodiment described with respect to FIG. 2, upon downward pressure of the user's finger 225 in an embodiment, the mouse key plate 221 may move downward, causing the key plate plunger 232 and the switch plunger 231 to move downward until the switch plunger 231 makes contact to switch the key plate switch 233 on the mouse PCB 240.

In an embodiment at block 608, the mouse controller may detect a signal from the key plate switch via the mouse PCB to register a mouse click. For example, in an embodiment described with reference to FIG. 1, the mouse controller or microcontroller unit (MCU) 142 mounted to the mouse PCB 140 in an embodiment may register a key plate click actuation signal received from the key plate switch 133 on the mouse PCB 140 and transmit an indication of such a mouse click user input to the hardware processor 101 of the information handling system 100.

At block 610, the mouse controller in an embodiment may direct the mouse PCB to transmit an electrical pulse through the solenoid of the electromagnetic spring system electromagnet, causing the electromagnetic spring system electromagnet to magnetize a ferromagnetic bar wound in the solenoid coil at a polarity. Once a key plate click actuation has been registered, the controller 142 on the mouse PCB 140 may transmit an electrical pulse through a solenoid of the electromagnetic spring back system 150 to magnetize a ferromagnetic bar in the electromagnet. In another example embodiment described with reference to FIG. 3, an electromagnetic spring back system electromagnet 352 may be operatively coupled to the mouse PCB 340 such that an electrical pulse emitted by the mouse PCB 340 to a solenoid coil 351 of the electromagnet 352 causes the electromagnet 352 to magnetize the ferromagnetic bar 354 to a first polarity (e.g., N) that is a same polarity as a permanent magnet under the key plate. Further, upon the absence of such an electrical pulse at the solenoid coil 351 after the key plate has returned to a neutral position, the ferromagnetic bar 354 will demagnetize and causes the electromagnet 352 to attract the permanent magnet.

The electromagnetic spring system electromagnet in an embodiment at block 612 may repel the electromagnetic spring system permanent magnet mounted to the bottom surface of the key plate to force the key plate upward to a neutral position. In an embodiment described with reference to FIG. 1, the electromagnetic spring back system 150 may increase the speed at which the key plate 121 returns to the neutral position following a key plate click actuation. For example, in an embodiment described with reference to FIG. 1, upon magnetization of the ferromagnetic bar of the electromagnet to a first polarity, the electromagnet may repel the permanent magnet of the same polarity operatively coupled to the bottom surface of the key plate 121 to urge the permanent magnet and key plate 121 upward and back into the neutral position. Thus, the speed at which the electromagnetic spring back system 150 rebounds the key plate 121 to the neutral position is increased compared to existing systems returning a key plate to the neutral position.

In another example embodiment described with respect to FIG. 3, an electromagnetic spring back system permanent magnet 353 having the first polarity (e.g., N) may be operatively coupled beneath a key plate (221 of FIG. 2) and directly above the electromagnetic spring back system electromagnet 352. In such an embodiment, the permanent magnet 353 may be mounted such that, upon application of an electrical pulse by the mouse PCB 340 to the solenoid coil 351 disposed around the ferromagnetic bar 354 of the electromagnetic spring back system electromagnet 352, the electromagnetic spring back system electromagnet 352 magnetizes the ferromagnetic bar and repels the electromagnetic spring back system permanent magnet 353. This may cause upward force on the key plate (221 of FIG. 2), to place the key plate in a neutral position rapidly so that the user may apply the next key plate click actuation sooner. The repelling force between the electromagnetic spring back system permanent magnet 353 and the magnetized ferromagnetic bar 354 of the charged electromagnetic spring back system electromagnet 352 in an embodiment increase the speed at which the repellant force causes the key plate (221 of FIG. 2) to return to the neutral position than in previous systems.

In another example embodiment described with reference to FIG. 4, the repelling force between the magnetized ferromagnetic bar 454 of the charged electromagnetic spring back system electromagnet 452 and the electromagnetic spring back system permanent magnet 453 may cause upward force on the electromagnetic spring back system permanent magnet 453 and consequently on the key plate 421, to place the key plate 421 in a neutral position where the user may apply the next click sooner than with previous systems.

At block 614, removal of electrical current from the solenoid coil of the electromagnetic spring back system electromagnet demagnetizes ferromagnetic bar of the electromagnetic spring back system electromagnet. Upon the ferromagnetic bar being demagnetized, the electromagnetic spring back system permanent magnet is attracted to the demagnetized ferromagnetic bar as described previously in block 602. This attraction may cause the electromagnet to attract the permanent magnet downward, causing the key plate to which the permanent magnet is mounted, and the key plate plunger disposed beneath the key plate to move slightly downward in a neutral position of the key plate. Such an attractive force may decrease the distance the key plate plunger must travel to contact and depress the switch plunger to switch the key plate switch. This may provide for increasing the click speed. Then the flow may return to block 604 to monitor for a next key plate click actuation.

In such a way, the electromagnetic spring back system for an electromagnetic spring back rapid click mouse may increase mouse click speed by decreasing the distance the key plate plunger has to travel from the neutral position in order to contact and depress the switch plunger and by increasing the speed at which the key plate returns to the neutral position following such a click. The method for an electromagnetic spring back rapid click mouse increasing speed at which a mouse registers user finger clicks may then end if no next key plate click actuation is received, however the system may still monitor for a next key plate click actuation.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An electromagnetic spring back rapid click mouse for an information handling system comprising:

a key plate forming a portion of a top cover of the electromagnetic spring back rapid click mouse for receiving downward force by a user of a key plate click actuation;

an electromagnetic spring back system permanent magnet operatively coupled to a bottom surface of the key plate and having a first polarity;

the electromagnetic spring back system permanent magnet situated above an electromagnetic spring back system electromagnet operatively coupled to a mouse printed circuit board (PCB) where the electromagnetic spring back system electromagnet includes a ferromagnetic material that is magnetized to the first polarity when the electromagnetic spring back system electromagnet is charged, where the electromagnetic spring back system permanent magnet is of the first polarity;

the key plate plunger to urge a switch plunger to switch a key plate switch on the mouse PCB upon the key plate click actuation on the key plate;

a mouse controller on the mouse PCB for detecting a switch signal from the key plate switch via the mouse PCB to register the key plate click actuation and magnetize the ferromagnetic material; and the mouse controller on the mouse PCB to provide a current pulse to charge the ferromagnetic material of the electromagnetic spring back system electromagnet to be magnetized to repel the electromagnetic spring back system permanent magnet upon detection of a key plate actuation at the mouse controller and urge the electromagnetic spring back system permanent magnet and the key plate to rebound to a neutral position after the key plate click actuation.

2. The electromagnetic spring back rapid click mouse of claim 1 further comprising:

the electromagnetic spring back system electromagnet includes a solenoid coil to receive the current pulse to magnetize a ferromagnetic bar of the ferromagnetic material to the first polarity when the electromagnetic spring back system electromagnet is charged.

3. The electromagnetic spring back rapid click mouse of claim 1 further comprising:

the ferromagnetic material of electromagnetic spring back system electromagnet is not magnetized when the electromagnetic spring back system electromagnet is not charged and attracts the electromagnetic spring back system permanent magnet downward with the key plate plunger and to minimize a distance between the switch plunger and the key plate plunger for key plate click actuation.

4. The electromagnetic spring back rapid click mouse of claim 3, wherein an attractive force between the electromagnetic spring back system permanent magnet and the electromagnetic spring back system electromagnet that is uncharged is less than a magnitude of downward force on the switch plunger required to cause the switch plunger to switch the key plate switch on the mouse PCB upon the key plate click actuation on the key plate.

5. The electromagnetic spring back rapid click mouse of claim 1 further comprising:

the mouse PCB operatively coupled to a wireless adapter for establishing a wireless link with the information handling system to transmit the key plate click actuation.

6. The electromagnetic spring back rapid click mouse of claim 1 further comprising:

the mouse PCB operatively coupled to a network interface device for establishing a wired link with the information handling system to transmit the key plate click actuation.

7. The electromagnetic spring back rapid click mouse of claim 1 further comprising:

the mouse key plate operatively coupled to a mouse top cover via a hinge such that the mouse key plate can move downward with respect to the mouse top cover upon downward pressure by a user's finger.

8. The electromagnetic spring back rapid click mouse of claim 1 further comprising:

a mouse controller sending a current pulse to a solenoid coil of the electromagnetic spring back system electromagnet to magnetize the ferromagnetic material therein upon detecting the switch signal from the key plate switch via the mouse PCB to register the key plate click actuation.

9. A method of assembling an electromagnetic spring back rapid click mouse for an information handling system comprising:

forming a key plate as a portion of a top cover of the electromagnetic spring back rapid click mouse for receiving downward force by a user of a key plate click actuation and including a key plate plunger extending from the key plate;

forming a switch plunger of a key plate switch, where the key plate switch is operatively coupled to a mouse printed circuit board (PCB) in a bottom cover of the electromagnetic spring back rapid click mouse;

operatively coupling a permanent magnet to a bottom surface of the key plate, the permanent magnet having a first polarity;

situating an electromagnetic spring back system electromagnet operatively coupled to the mouse PCB within a magnetic field of the permanent magnet, where the electromagnetic spring back system electromagnet is formed of a ferromagnetic bar and is magnetized to the first polarity upon receiving a first current pulse;

forming a solenoid coil wrapped around the ferromagnetic bar for the electromagnetic spring back system electromagnet, where the solenoid coil is operatively coupled to receive the current pulse from the mouse PCB upon the key plate click actuation detected at the mouse PCB and where the ferromagnetic bar is unmagnetized with no current pulse in the solenoid coil to attract the permanent magnet and the ferromagnetic bar is magnetized with the current pulse in the solenoid coil to repel the permanent magnet to rebound the key plate after a key plate click actuation; and a mouse controller formed on the mouse PCB operatively coupled to detect the key plate click actuation of the key plate switch during depression of the keyplate with the downward force applied by the user and the mouse controller formed to provide a current pulse to the solenoid coil upon detection of actuation of the key plate switch on the mouse PCB.

10. The method of claim 9, wherein an attractive force between the permanent magnet and the electromagnetic spring back system electromagnet when the ferromagnetic bar is unmagnetized is less than a magnitude of downward force on the switch plunger required to switch the key plate switch on the mouse PCB.

11. The method of claim 9 further comprising:

operatively coupling the mouse PCB to a wireless adapter for establishing a wireless link with the information handling system to transmit the key plate click actuation from the mouse controller on the mouse PCB.

12. The method of claim 9 further comprising:

operatively coupling the mouse PCB to a network interface device for establishing a wired link with the information handling system to transmit the key plate click actuation from the mouse controller.

13. The method of claim 9 further comprising:

disposing the key plate plunger extending from the bottom side of the key plate above the switch plunger of the key plate switch located on a first location of the mouse PCB in a housing of the electromagnetic spring back rapid click mouse; and disposing the permanent magnet above the electromagnetic spring back system electromagnet on a second location of the mouse PCB in the housing of the electromagnetic spring back rapid click mouse.

14. The method of claim 9 further comprising:

the mouse controller operatively coupled to the mouse PCB to detect actuation of the key plate switch during the key plate click actuation and transmit the key plate click actuation to the information handling system.

15. An electromagnetic spring back rapid click mouse for an information handling system comprising:

a key plate forming a portion of a top cover of the electromagnetic spring back rapid click mouse for receiving downward force by a user of a key plate click actuation;

a permanent magnet operatively coupled to a bottom surface of the key plate and having a first polarity;

the permanent magnet situated above an electromagnetic spring back system electromagnet operatively coupled to a mouse printed circuit board (PCB) where the electromagnetic spring back system electromagnet includes a solenoid coil wrapped around a ferromagnetic bar that is magnetized to the first polarity when the solenoid coil is provided with a current pulse;

the key plate plunger to urge a switch plunger to switch a key plate switch on the mouse PCB upon the key plate click actuation;

a mouse controller on the mouse PCB to detect a switch signal from the key plate switch via the mouse PCB to register the key plate click actuation when a user depresses a keyplate with downward force; and the mouse controller on the mouse PCB to provide the current pulse to charge the ferromagnetic material of the electromagnetic spring back system electromagnet via the mouse PCB to be magnetized to repel the permanent magnet upon detection of the key plate actuation at the mouse controller and urge the permanent magnet and the key plate to rebound to a neutral position after the key plate click actuation.

16. The electromagnetic spring back rapid click mouse of claim 15 further comprising:

the mouse controller for ceasing application of the electrical pulse to the solenoid of the electromagnetic spring back system electromagnet to demagnetize the ferromagnetic bar upon receiving indication of the key plate click actuation from the key plate switch to generate an attractive magnetic force between the permanent magnet and the ferromagnetic bar when the key plate is in the neutral position.

17. The electromagnetic spring back rapid click mouse of claim 16, wherein the attractive magnetic force between the permanent magnet and ferromagnetic bar that is demagnetized is less than a magnitude of downward force required on the switch plunger to switch the key plate switch on the mouse PCB to avoid inadvertent recording of the key plate click actuation.

18. The electromagnetic spring back rapid click mouse of claim 15 further comprising:

the ferromagnetic bar of electromagnetic spring back system attracts the permanent magnet when the ferromagnetic bar of electromagnetic spring back system is demagnetized with no current in the solenoid coil to urge downward the key plate plunger of the key plate to minimize a distance between the switch plunger and the key plate plunger to switch the key switch during the key plate click actuation.

19. The electromagnetic spring back rapid click mouse of claim 15 further comprising:

the mouse PCB operatively coupled to a network interface device for establishing a wired link with the information handling system.

20. The electromagnetic spring back rapid click mouse of claim 15 further comprising:

the mouse PCB operatively coupled to a wireless adapter for establishing a wireless link with the information handling system.

* * * * *